(12) United States Patent
Maj et al.

(10) Patent No.: US 9,688,431 B2
(45) Date of Patent: Jun. 27, 2017

(54) LONGITUDINAL SEALING DEVICE

(71) Applicant: Robert Bosch GmbH, Stuttgart (DE)

(72) Inventors: Maurizio Maj, Winterthur (CH); Hubert Eckert, Klettgau (DE)

(73) Assignee: ROBERT BOSCH GMBH, Stuttgart (DE)

( * ) Notice: Subject to any disclaimer, the term of this patent is extended or adjusted under 35 U.S.C. 154(b) by 4 days.

(21) Appl. No.: 14/652,212

(22) PCT Filed: Nov. 20, 2013

(86) PCT No.: PCT/EP2013/074236
§ 371 (c)(1),
(2) Date: Jun. 15, 2015

(87) PCT Pub. No.: WO2014/090528
PCT Pub. Date: Jun. 19, 2014

(65) Prior Publication Data
US 2016/0194102 A1    Jul. 7, 2016

(30) Foreign Application Priority Data
Dec. 13, 2012 (DE) .......................... 10 2012 223 072

(51) Int. Cl.
*B65B 51/30* (2006.01)
*B29C 65/18* (2006.01)
(Continued)

(52) U.S. Cl.
CPC .............. *B65B 51/30* (2013.01); *B29C 65/18* (2013.01); *B29C 65/7894* (2013.01);
(Continued)

(58) Field of Classification Search
CPC .......... B29C 65/7894; B29C 66/81465; B29C 66/81467; B29C 66/83413;
(Continued)

(56) References Cited

U.S. PATENT DOCUMENTS 2,796,912 A * 6/1957 Bartosz ................... B29C 65/04
    156/274.6
3,064,403 A * 11/1962 Tokos ..................... B65B 51/18
    53/371.4
(Continued)

FOREIGN PATENT DOCUMENTS

DE    69402630    10/1997
DE    69600796    4/1999
(Continued)

OTHER PUBLICATIONS

International Search Report for Application No. PCT/EP2013/074236 dated Feb. 21, 2014 (English Translation, 2 pages).

*Primary Examiner* — Philip Tucker
*Assistant Examiner* — Jimmy R Smith, Jr.
(74) *Attorney, Agent, or Firm* — Michael Best & Friedrich LLP

(57) ABSTRACT

The invention relates to a longitudinal sealing device (1) for producing a sealed longitudinal seam (2) on a packaging material (3) which has a tubular portion (4) and a seam portion (5) that adjoins the tubular portion (4) and comprises the sealed longitudinal seam (2). A first layer (6) of the packaging material and a second layer (7) of the packaging material lie one above the other in the seam portion (5). The tubular portion (4) lies above a transport plane (T) of the longitudinal sealing device (1), and the seam portion (5), lying below the transport plane, is moved along a running direction (L) parallel to the transport plane (T). The longitudinal sealing device (1) comprises a positioning device (8) in order to position the two layers (6, 7) relative to each other, a heated sealing roller pair (9) in order to provide the sealed longitudinal seam (2) between the two layers (6, 7), and an unheated conveyor roller pair (10) arranged downstream of the sealing roller pair (9) when seen in the running direction (L). The sealing roller pair (9) comprises two
(Continued)

sealing rollers (9a, 9b), a sealing lateral face (17) of which contacts the packaging material (3), and the conveyor roller pair (10) comprises two conveyor rollers (10a, 10b), a conveyor lateral face (18) of which contacts the packaging material. The sealing lateral face (17) of the sealing roller pair (9) is offset relative to the conveyor lateral face (18) in a direction (S) perpendicular to the transport plane.

22 Claims, 6 Drawing Sheets

(51) Int. Cl.
  *B29C 65/78*  (2006.01)
  *B65B 51/16*  (2006.01)
  *B65B 51/26*  (2006.01)
  *B65B 9/067*  (2012.01)
  *B65B 9/06*  (2012.01)
  *B29C 65/00*  (2006.01)
  *B29K 101/12*  (2006.01)
  *B29K 105/00*  (2006.01)
  *B29L 31/00*  (2006.01)

(52) U.S. Cl.
  CPC ........ *B29C 66/133* (2013.01); *B29C 66/4312* (2013.01); *B29C 66/4322* (2013.01); *B29C 66/81465* (2013.01); *B29C 66/81467* (2013.01); *B29C 66/83413* (2013.01); *B29C 66/849* (2013.01); *B65B 9/06* (2013.01); *B65B 9/067* (2013.01); *B65B 51/16* (2013.01); *B65B 51/26* (2013.01); *B29C 66/1122* (2013.01); *B29C 66/83513* (2013.01); *B29K 2101/12* (2013.01); *B29K 2105/256* (2013.01); *B29L 2031/7128* (2013.01); *B65B 2220/08* (2013.01)

(58) Field of Classification Search
  CPC ........... B29C 66/83513; B29C 66/1122; B29C 66/133; B29C 66/4312; B29C 66/4322; B29C 66/849; B29C 65/18; B65B 9/067; B65B 9/06; B65B 2220/08; B65B 51/16; B65B 51/26; B65B 51/30; B29K 2101/12; B29K 2105/256; B29L 2031/7128
  USPC ..... 156/583.1; 53/373.7, 375.3, 374.3, 374.4
  See application file for complete search history.

(56) References Cited

U.S. PATENT DOCUMENTS

| | | | |
|---|---|---|---|
| 4,807,426 A | | 2/1989 | Smith |
| 5,341,623 A | * | 8/1994 | Siegel ................. B29C 65/7451 53/433 |
| 5,435,115 A | | 7/1995 | Simmons |
| 5,706,635 A | | 1/1998 | Simmons |
| 6,289,961 B1 | | 9/2001 | Bausch et al. |
| 2005/0167056 A1 | | 8/2005 | Stork |

FOREIGN PATENT DOCUMENTS

| | | |
|---|---|---|
| DE | 102004032774 | 6/2005 |
| EP | 1028055 | 8/2000 |
| JP | 2000109127 | 4/2000 |

* cited by examiner

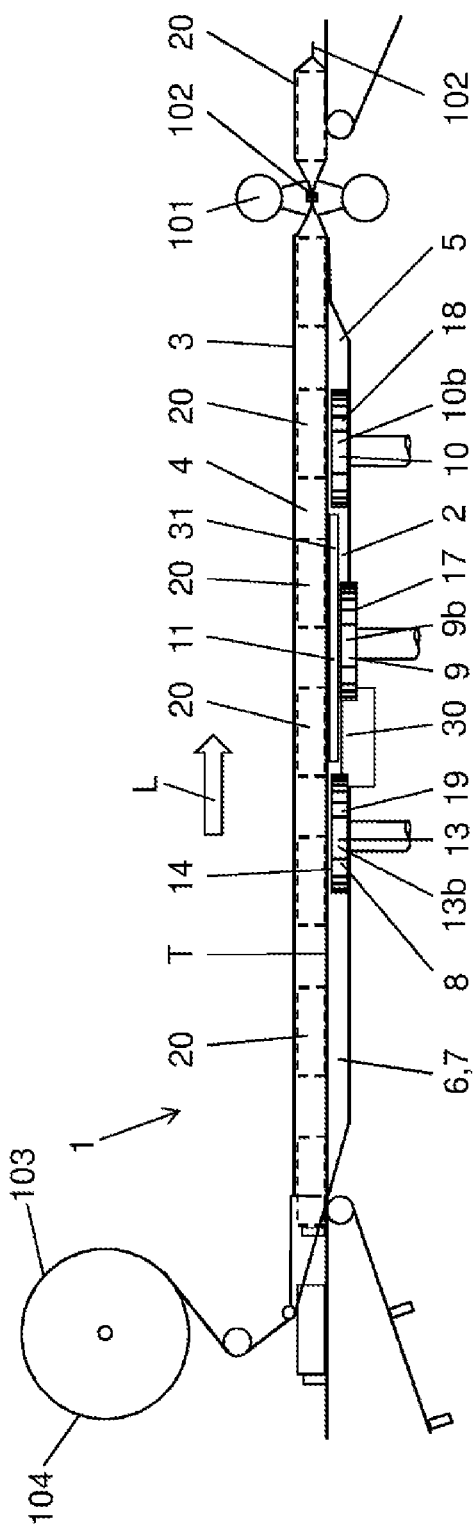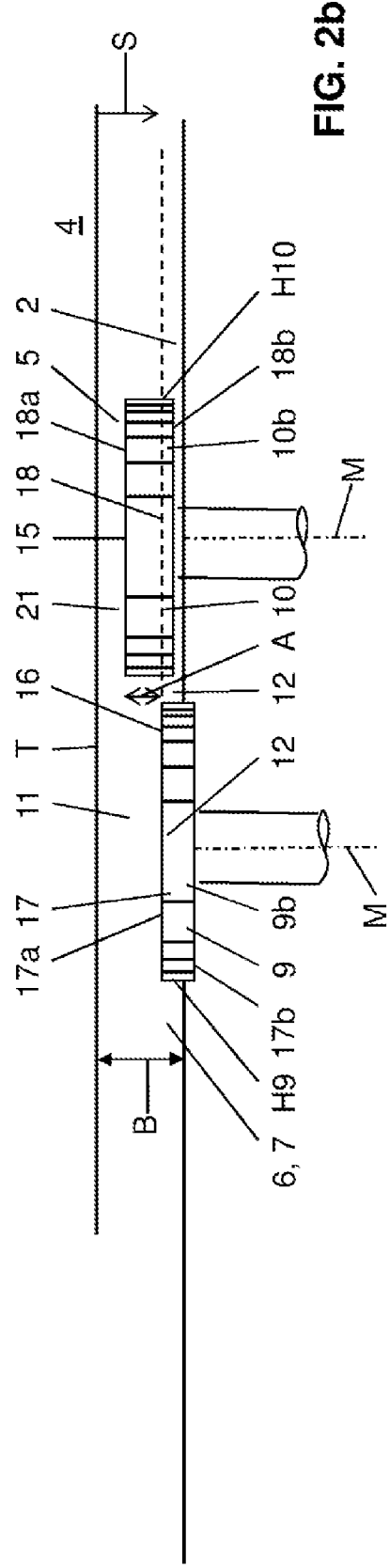

LONGITUDINAL SEALING DEVICE

BACKGROUND OF THE INVENTION

The present invention relates to a longitudinal sealing device for producing a sealed seam.

In the case of horizontal tubular bag packaging machines, an endless film is formed around the products/product groups to be packaged by means of a so-called forming shoulder to form a tube, the lateral film edges being placed one on top of another and sealed to form a fin seam. For transporting the tube with the products located therein and consequently also the unrolling of the films from the film roll is carried out as a rule by way of pairs of contra-rotating rollers which convey the fin seam. At least one of the pairs of rollers is heated, as a result of which the two film regions that are located one on top of another are welded by the fin seam.

A cross-seam is then welded between two products/product groups transversely with respect to the running direction of the tube by way of a cross-sealing station and said cross-seam is separated by way of a blade. This creates individual so-called tubular bags. By way of said tubular bags, the product is protected on the one hand against mechanical influences, it also being possible to achieve protection against ingress of moisture and/or of gases/oxygen.

Solutions which convey and seal the longitudinal sealed seam by means of three pairs of rollers which are located one behind another in the conveying direction of the tube are known from the prior art. In this case, as a rule, the first roller pair is cold and is provided exclusively for joining together the parts of the film to be welded and for transporting the tube. The film parts to be welded are also designated as fins. A fin is to be understood as film edge regions which are placed one on top of the other by way of their inside surface. This is referred to in technical jargon as a fin seam. The second roller pair is heated and the third roller pair can also be heated but can also be cold. In this case, the job of the third roller pair is to seal the film region, which has been melted by the second roller pair, by means of pressure and additionally, as an option, heat. It consequently has to be arranged on the same plane or at the same height as the second pair of rollers. At the same time, the tube is conveyed by way of said pair of rollers.

Good results can be achieved with the three rollers that are arranged one behind another when using so-called multiple layer or multi-layer films. Said films typically comprise a mechanically stable and non-heat-sensitive carrier layer and at least one or several sealing layers. The sealing layers melt on exposure to heat. On account of the carrier layer, said films are stable against tensile forces produced by their layer structure. Conveying the tube by said melted regions functions well as the carrier layer provides the necessary stability.

However, there are applications where mono-films are used. In the case of such mono-films there is no mechanically stable carrier layer. Low-priced, thinner hot-sealable films, which lose stability very rapidly as a result of being heated up, are also used more and more frequently. When said mono-films are conveyed using the above-mentioned devices with the three pairs of rollers, it has been ascertained that the weld point is negatively influenced by means of the roller which follows after the heated roller. Tensile forces occur in the material which weaken the weld. In addition, it has been ascertained that the film could become contorted, which is also very disadvantageous because it then has a negative impact on the tightness of the weld.

Said negative factors occur increasingly, in particular in the case of higher film speeds.

SUMMARY OF THE INVENTION

Proceeding from said prior art, the object underlying the invention is to provide a device which overcomes the disadvantages of the prior art. In particular, it is an object of the invention that the quality of the longitudinal sealed seam is improved. A further object of the invention is improving the quality of the longitudinal sealed seam of temperature-sensitive films, such as mono-films or low-cost, thin heat-sealable films. In particular, the longitudinal seam is to remain on the packaging to be produced and the film is also to be processable at higher film speeds.

Accordingly, a longitudinal sealing device serves for producing a longitudinal sealed seam on a packaging material which comprises a tubular portion as well as a seam portion that connects to the tubular portion and has the longitudinal sealed seam, in which seam portion a first layer of the packaging material and a second layer of the packaging material lie one above another other. The tubular portion on a first side, preferably above a conveying plane of the longitudinal sealing device, and the seam portion on a second side, preferably below a conveying plane of the longitudinal sealing device, are moved along a running direction which extends parallel to said conveying plane. The longitudinal sealing device includes a positioning device for positioning the two layers with respect to one another, a pair of heated sealing rollers for providing the longitudinal sealed seam between the two layers and a pair of non-heated of conveyor rollers which are arranged, when viewed in the running direction, downstream of the pair of sealing rollers. The pair of sealing rollers include two sealing rollers which are in contact with the packaging material by way of a sealing outside surface. The pair of conveyor rollers include two conveyor rollers which are in contact with the packaging material by way of a conveying outside surface. The sealing outside surface of the pair of sealing rollers is arranged offset to the conveying outside surface in a direction perpendicular to the conveying plane.

As a result, the pair of conveyor rollers, by way of the conveying outside surface, engage the packaging material with an offset with respect to the sealing outside surface, as a result of which it is ensured that the pair of conveyor rollers, by way of the conveying outside surface, engage a packing material region which has not been heated by the sealing outside surfaces. Said non-heated regions, in this case, comprise a greater stability compared to the heated regions, as a result of which the advancing is improved. In addition, the sealed seam is also not influenced negatively by the conveyor rollers. There is no exclusive application of force onto the sealed seam.

Insofar as the sealing outside surface and the conveying outside surface, when viewed in the running direction, are overlapping, which is an option, the advantage of said configuration is then that, on the one hand, the conveyor rollers engage the non-heated region and, on the other hand, the conveyor rollers compress the heated region in the heated region, which has a positive effect on the sealing.

It can be said in summary that the sealed seam, once set up by the sealing rollers, is not influenced in a disadvantageous manner by the conveyor rollers. In this respect, a high-quality sealed seam can be provided with the longitudinal sealing device.

However, it is also possible for the tubular portion to be located below the conveying plane and the seam portion to be located above the conveying plane.

In a particularly preferred manner, the seam portion is a fin seam portion, a fin seam being created.

The sealing outside surface of the pair of sealing rollers is arranged at a distance from the conveying plane in the direction perpendicular to the conveying plane and the conveying outside surface of the pair of conveyor rollers is offset with respect to the pair of sealing rollers in the said direction. The conveying outside surface is preferably offset toward the conveying plane with respect to the sealing outside surface.

The sealing outside surface is preferably defined by a top edge and a bottom edge and the conveying outside surface is defined by a top edge and a bottom edge. The two top edges are arranged offset or spaced apart from one another by a distance with reference to the said direction. The top edge of the conveying outside surface lies closer to the conveying plane than the top edge of the sealing outside surface, as a result of which it is ensured that the conveying outside surface always engages the cold region of the sealed seam.

In a particularly preferred manner, the bottom edge of the conveying outside surface lies below the top edge of the sealing outside surface such that the pair of conveyor rollers engage with the conveying outside surface in the region of said distance and in the effective region of the sealing outside surface of the pair of sealing rollers. In other words: the pair of conveyor rollers preferably engage, when viewed in the running direction, with the conveying outside surface in the region of the said distance and in the effective region of the sealing outside surface of the pair of sealing rollers. An effective region is to be understood in this context as the region in which the sealing outside surface comes into contact with the packaging material. This corresponds substantially to the sealed seam. With said embodiment, the function of the pair of conveyor rollers is to convey in the non-heated region and to apply a pressing pressure onto the heated seal, as a result of which it is pressed additionally.

In an alternative embodiment, the bottom edge of the conveying outside surface lies at the same height or above the top edge of the sealing outside surface such that the pair of conveyor rollers engage in a bordering manner with the conveying outside surface or outside of the effective region of the sealing outside surface of the pair of sealing rollers. In other words it can also be said that the pair of conveyor rollers engage with the conveying outside surface exclusively in the region between the top edge of the sealing outside surface and the conveying plane. This ensures that the pair of conveyor rollers have absolutely no influence on the seal. Said embodiment is substantially suitable for sensitive films in this respect.

The conveying outside surface of the pair of conveyor rollers, when viewed at right angles to the conveying plane, preferably comprises a height which is smaller than the distance between the conveying plane and the top edge of the sealing outside surface, wherein the conveying outside surface, when viewed with reference to the conveying plane, is located exclusively within said distance.

In an alternative embodiment, the conveying outside surface of the pair of conveyor rollers, when viewed at right angles to the conveying plane, comprises a height which greater than the distance between the conveying plane and the top edge of the sealing outside surface, wherein the conveying outside surface, when viewed with reference to the conveying plane, is located within said distance and, when viewed in the direction of the running direction, in the effective region of the sealing outside surface.

The distance between the top edge of the sealing outside surface and the top edge of the conveying outside surface is at least 2 mm, in a particularly preferred manner at least 4 mm. As an alternative to this, the distance between the top edge of the sealing outside surface and the top edge of the conveying outside surface is between 2 mm and 25 mm, in particular between 2 mm the and 15 mm and in a particularly preferred manner between 2 mm and 8 mm.

The sealing outside surfaces of the pair of sealing rollers preferably comprise a height of at least 1 mm, and a maximum of 15 mm, in particular a maximum of 10 mm and in a particularly preferred manner a maximum or 5 mm.

The positioning device preferably includes a pair of non-heated of positioning rollers with two positioning rollers which comprise positioning outside surfaces. With the positioning device, the two layers of the packaging material are positionable with respect to one another the packaging material is movable along the running direction, the pair of positioning rollers preferably connecting substantially directly to the conveying plane by way of the end face that faces the conveying plane or the positioning outside surfaces.

The pair of positioning rollers, when viewed in the running direction, is arranged upstream of the pair of sealing rollers. This means for the relative arrangement between the pairs of rollers that, when viewed in the running direction, the first pair of rollers are the pair of positioning rollers. When viewed in the running direction, downstream of the pair of positioning rollers next come the pair of sealing rollers which, in turn, are followed by the pair of conveying rollers.

The height of the positioning outside surfaces, when viewed at right angles to the conveying plane, corresponds preferably substantially to the length of the seam portion, when viewed at right angles to the conveying plane, or is greater than said length. Consequently, no transverse forces are able to act on the tubular bag.

In a particularly preferred manner, the pair of positioning rollers with the end faces of the positioning rollers that face the conveying plane are located at the same height as the pair of conveyor rollers with the end faces of the conveyor rollers that face the conveying plane. Consequently. The pairs of rollers are located at the same height, which also prevents the generation of transverse forces. In addition, the heights of the positioning outside surfaces and of the conveying outside surfaces can also be realized so as to be the same height.

The pair of conveyor rollers preferably connect substantially directly to the conveying plane with the end faces that face the conveying plane or the conveying outside surfaces. In a particularly preferred embodiment, the pair of conveyor rollers and the pair of positioning rollers are both located directly on the conveying plane with the end faces that face that face the conveying plane.

In a further development of the present invention, a cooling element, which extends from the conveying plane in the direction of the pair of sealing rollers, is arranged in the region of the pair of sealing rollers, wherein the height of the cooling element, when viewed from the conveying plane, is smaller than the distance between the end faces of the sealing rollers that face the conveying plane and the conveying plane or between the top edge of the sealing outside surface of the sealing rollers and the conveying plane.

The cooling element is preferably in the form of a plate.

In a particularly preferred manner, each of the pairs of rollers comprise two rollers which are arranged spaced apart from one another and are rotated about center axes which extend parallel to one another, wherein the packaging material runs through said rollers with the seam portion.

A horizontal tubular bag packaging machine for producing a tubular bag includes a longitudinal sealing device, wherein the conveying plane is located substantially in the horizontal.

BRIEF DESCRIPTION OF THE DRAWINGS

Preferred embodiments of the invention are described below by way of the drawings which purely serve for explanation purposes and are not to be seen as restricting, in which:

FIG. 2a shows a schematic side view of a longitudinal sealing device according to an embodiment of the present invention;

FIG. 2b shows a view of a detail of FIG. 2a;

DETAILED DESCRIPTION

Figure 1:
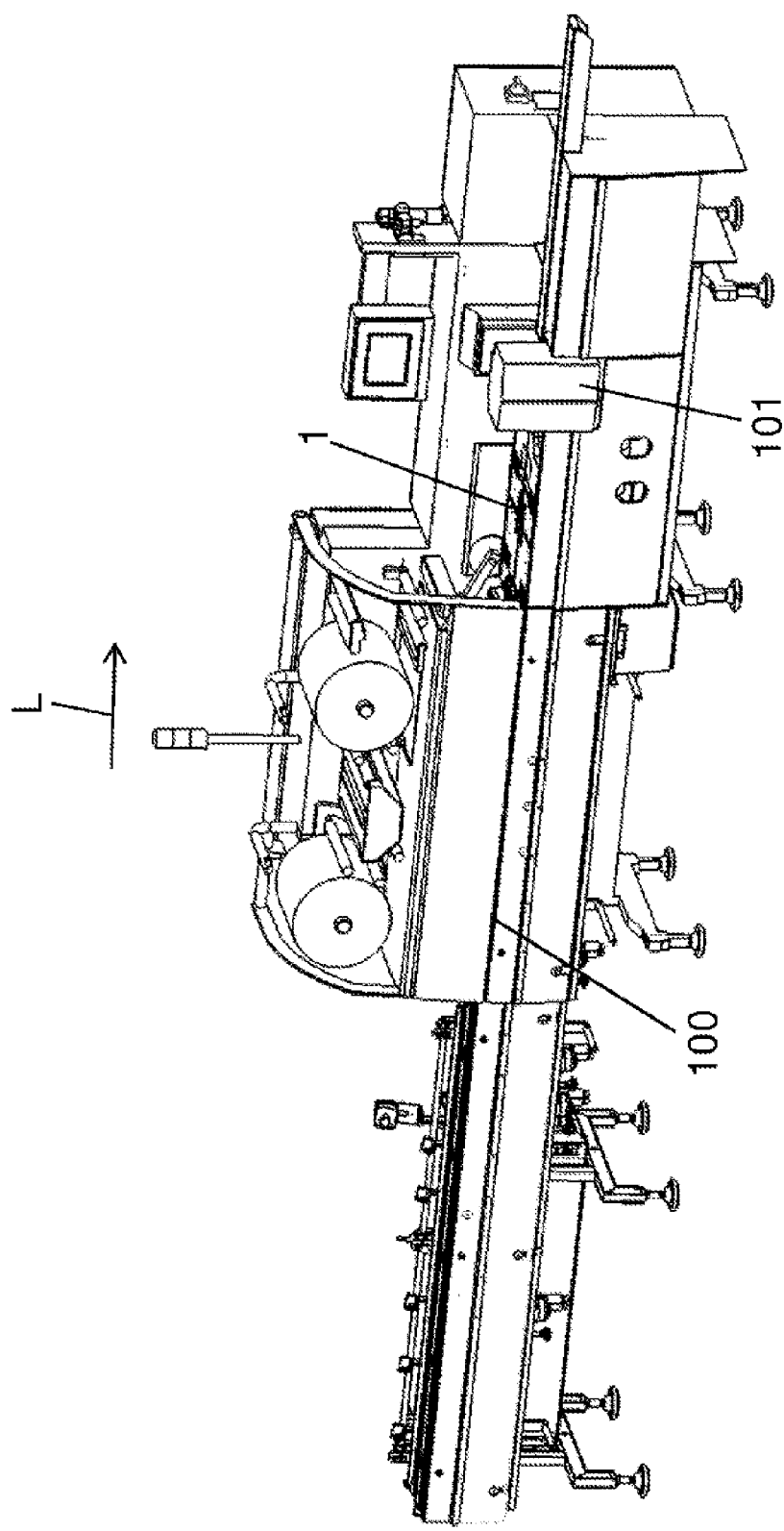
FIG. 1 shows a view of an apparatus with a longitudinal sealing device for sealing a packaging material.

FIG. 1 shows a perspective view of a tubular bag packaging machine. Such machines are known from the prior art in principle. The tubular bag packaging machine shown here includes a longitudinal sealing device 1 according to the invention for producing a sealed seam. In addition, the tubular bag packaging machine includes a feed section 100, by means of which the products to be packaged are supplied along with an endless film which surrounds the products to form a tube. The tube with the products located therein is supplied to the longitudinal sealing device 1. When viewed in the running direction L, downstream of the longitudinal sealing device 1 the tubular bag packaging machine also includes a cross-sealing device 101 which sets up a cross-sealed seam transversely with respect to the running direction L on the tubular bag. Consequently, a product can be packaged in a tubular bag with the longitudinal sealing device 1 according to the invention and the cross-sealing device 101.

FIG. 2a shows a schematic view of the longitudinal sealing device 1. The longitudinal sealing device 1 serves for producing a longitudinal sealed seam 2 on a packaging material 3. In the region of the longitudinal sealing device 1, the packaging material 3, in this case, comprises a tubular portion 4 as well as a seam portion 5 which connects to the tubular portion 4. The products 20 to be packaged are located in the tubular portion 4 and the longitudinal sealed seam 2 is produced with the longitudinal sealing device 1 in the seam portion 5. A first layer 6 of the packaging material 3 and a second layer 7 of the packaging material 3 lie one on top of another in the seam portion 5. The layers, in this case, are preferably congruent. The tubular portion 4, in this case, is located above a conveying plane T of the longitudinal sealing device 1. The seam portion 5, in this case, is located below the conveying plane T of the longitudinal sealing device 1. Both the tubular portion 4 and the seam portion 5 are moved along a running direction L which extends parallel to said conveying plane. This is illustrated by the arrow L in FIG. 2a. The conveying plane T preferably extends horizontally. However, it can also be provided in other applications that the conveying plane T is at an angle to the horizontal.

The longitudinal sealing device 1 includes substantially a positioning device 8 for positioning the two layers 6, 7 with respect to one another, a pair of heated sealing rollers 9 for providing the longitudinal sealed seam 2 between the two layers 6, 7 and a pair of non-heated conveyor rollers 10 which are arranged, when viewed in the running direction L, downstream of the pair of sealing rollers 9. When viewed in the running direction L, the positioning device 8 is followed by the pair of sealing rollers 9 and then the pair of conveying rollers 10. In other embodiments, the arrangement of further pairs of rollers with the same or a different function is also conceivable. A pre-heating means 30 can also be arranged to heat the film edge regions 6, 7 better.

Figure 3:
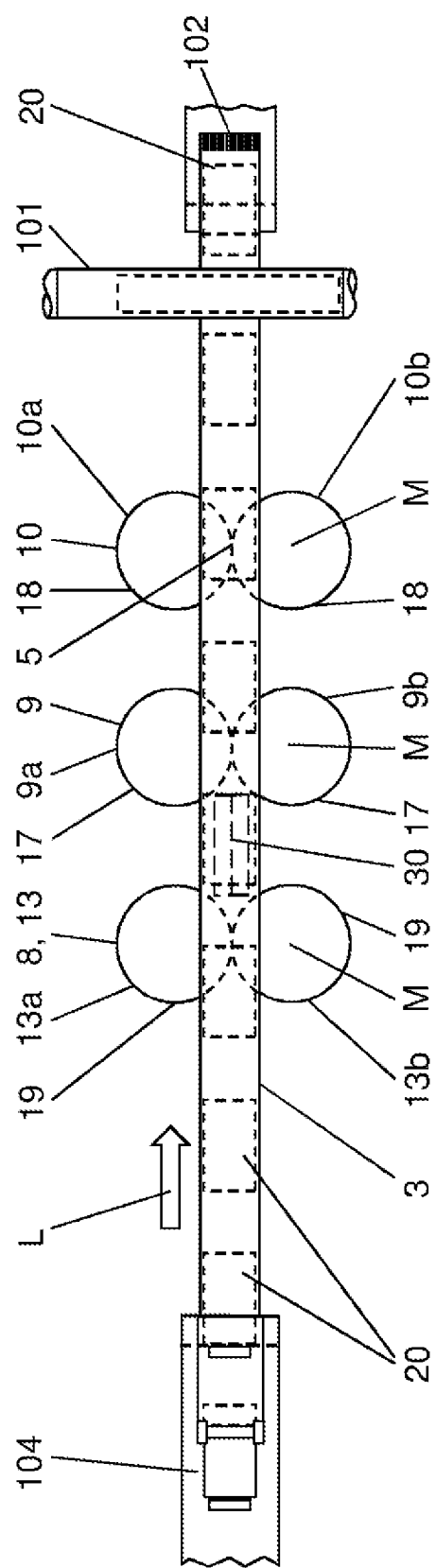
FIG. 3 shows a schematic top view of the longitudinal sealing device according to FIG. 2.

It can be seen from FIG. 3 that the pair of sealing rollers 9 includes 2 sealing rollers 9a, 9b. The sealing rollers 9a, 9b are in contact in each case by way of a sealing outside surface 17 with the packaging material 3 or with the first layer 6 and the second layer 7. The actual longitudinal sealed seam 2 is provided by means of the sealing outside surface 17 which can also be seen well in FIG. 2b. The sealing outside surface 17 can extend over the entire height of the sealing rollers 9a, 9b or only over part thereof. The height of the sealing outside surface 17 is specified by H9. The sealing outside surface 17 is defined by a top edge 17a and a bottom edge 17b. The top edge 17a, in this case, is closer to the conveying plane T than the bottom edge 17b. The top edge 17a and the bottom edge 17b are circumferential edges which extend around the center axis M.

It can also be seen from FIG. 3 that the pair of conveyor rollers 10 include two conveyor rollers 10a, 10b. The conveyor rollers 10a, 10b include in each case a conveying outside surface 18 which is in contact with the packaging material 3 or with the first layer 6 and the second layer 7 of the packaging material 7. The packaging material 3 is moved along the running direction L by means of the conveying outside surface 18. The conveying outside surface 18 of the conveyor roller 10b can easily be seen in FIG. 2b. In this case the conveying outside surface 18 extends over the entire height of the conveyor roller 10b. It is also conceivable for the conveying outside surface not to extend over the entire height of the conveyor roller 10b. The height of the conveying outside surface 18 is specified by way of H10. The conveying outside surface 18 is defined by a top edge 18a and a bottom edge 18b. The top edge 18a, in this case, is closer to the conveying plane T than the bottom edge 18b. The top edge 18a and the bottom edge 18b are circumferential edges which extend around the center axis M.

FIG. 2a and in particular the enlarged representation in FIG. 2b show that the sealing outside surface 17 of the pair of sealing rollers 9 is arranged offset with respect to the conveying outside surface 18 in a direction S perpendicular to the conveying plane T. In other words: the sealing outside surface 17 of the pair of sealing rollers 9 is arranged at a spacing from the conveying plane T in a direction perpendicular to the conveying plane T and the conveying outside surface 18 of the pair of conveyor rollers 10 is offset in said direction with respect to the pair of sealing rollers 9. As a consequence, therefore, the sealing outside surface 17 and the conveying outside surface 18 are not located at the same height with reference to the conveying plane T. The top edge 17a of the sealing outside surface 17 and the top edge 18a of the conveying outside surface 18 are arranged spaced apart from one another in the said direction. The distance between the two top edges 17a and 18a is specified in the figures with the reference A. In this case, the top edge 18a of the conveying outside surface 18 is closer to the conveying plane T than the top edge 17a of the sealing outside surface 17. The advantage of said offset or distance is that the conveying outside surface of the pair of conveyor rollers 10 always engages the packaging material 3 in a region which has not been heated by the pair of sealing rollers 9. As a result, the pair of conveyor rollers 19 always engages a mechanically stable region of the packaging material 3 and the packaging material 3 is not distorted, as a result of which the packaging material 3 is also not influenced negatively in the region of the longitudinal sealed seam 2. The said direction perpendicular to the conveying plane T is shown by the arrow S in FIG. 2b.

The sealing outside surface 17 is at a spacing from the conveying plane T by a distance, a space 11 being created between the conveying plane T and the top edge 17a of the sealing outside surface 17. The conveying outside surface 18, in this case, is located at least in part in the space 11. As a consequence, the conveying outside surface 18 engages the seam portion 5 at least in part in the space 11. The region of the seam portion 5 which is located in the space 11 can also be designated as non-heated region 21.

In FIG. 2b the conveying outside surface 18 is located both in the space 11 and in the region where the sealed seam 2 has been produced by the sealing outside surface 17. In the configuration according to FIG. 2b, the bottom edge 18b of the conveying outside surface 18 is located below the top edge 17a of the sealing outside surface 17 such that the pair of conveyor rollers 10 engage by way of the conveying outside surface 18 in the region of said distance A and in the effective region 12 of the sealing outside surface 17 of the pair of sealing rollers 9. In other words it can be said that the conveying outside surface 18 also engages in the effective region 12 of the sealing outside surface 17. The advantage of said embodiment is that, on the one hand, the solid region of the packaging material 3 which has not been heated by the pair of sealing rollers 9 is engaged along with, on the other hand, the region that has been heated by the pair of sealing rollers 9. As a consequence, in this case the pair of conveyor rollers 10 have the function of, on the one hand, ensuring the advancing of the packing material 3 and, on the other hand, at the same time exerting a force onto the longitudinal sealed seam 2 which strengthens said seam in a corresponding manner.

FIGS. 2a and 3 additionally also show a schematic representation of the cross-sealing station 101 when viewed downstream in the running direction L. The cross-sealing station 101 provides a cross-sealed seam 102. Consequently, the product 20 is completely packaged in the tubular bag with the cross-sealing device 101, as is shown in FIG. 2a. FIG. 3 also additionally shows the cross-sealed seam 102 in a corresponding manner. The feed roller 103 of a feed device 104 can also be seen in FIGS. 2a and 3. The packaging material is unwound and supplied to the longitudinal sealing device 1 by means of said feed roller 103. The feed device 104 and the cross-sealing device 101 are known substantially in the prior art.

Figure 4A:
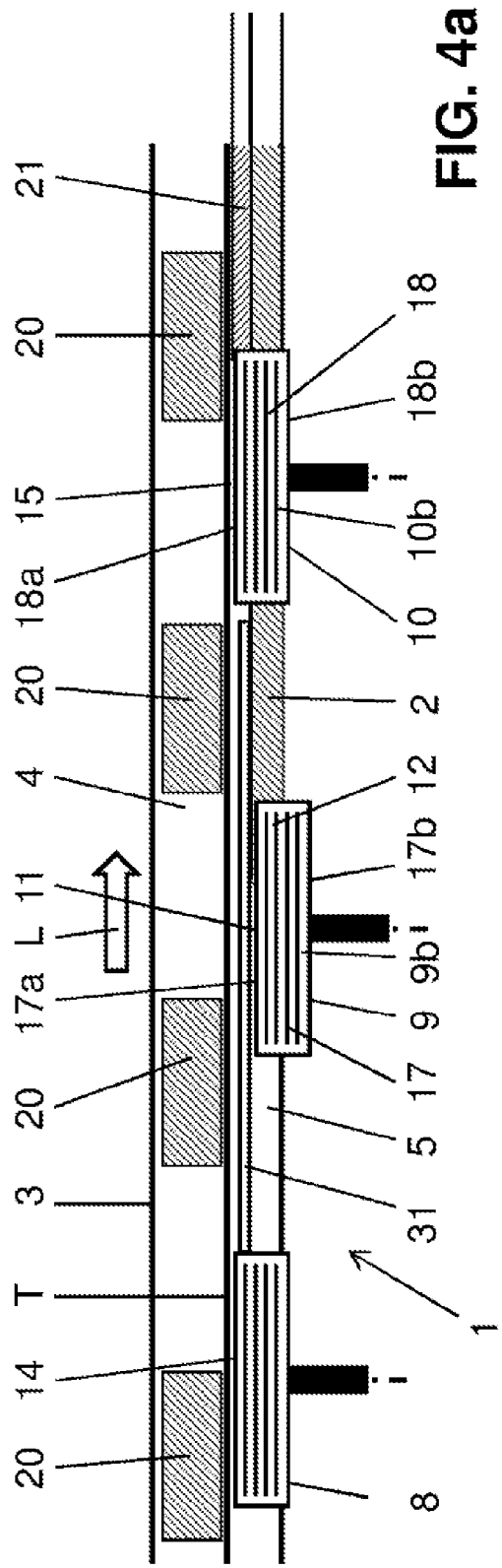
FIG. 4a shows a schematic side view of a longitudinal sealing device according to a first embodiment of the present invention.
Figure 4B:
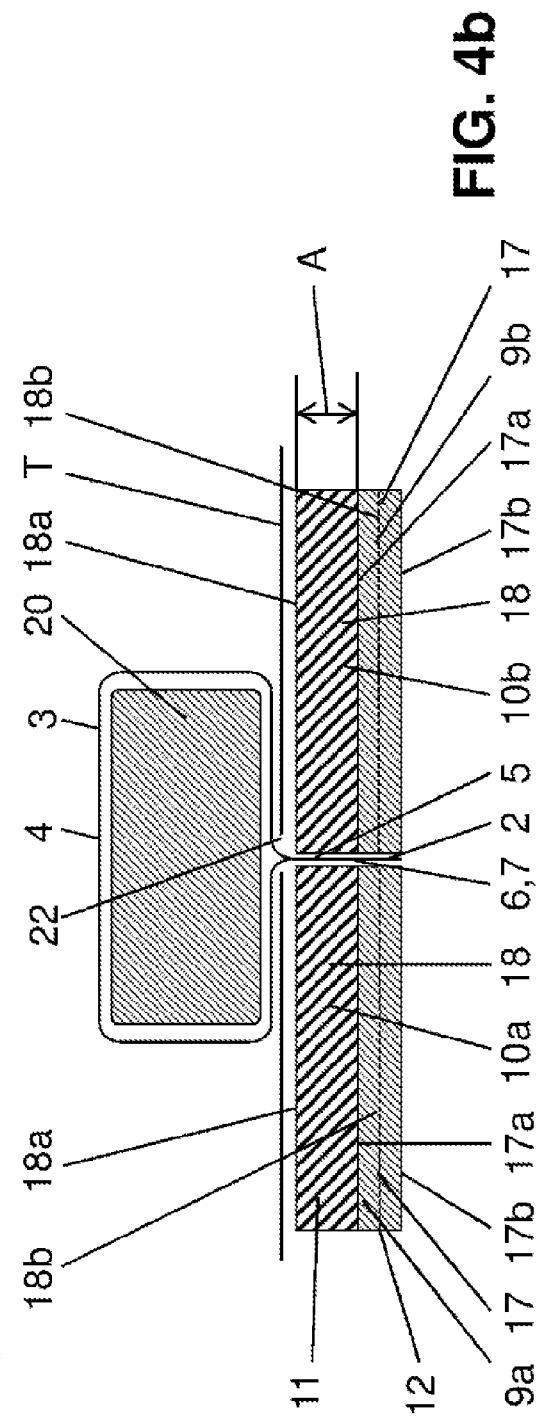
FIG. 4b shows a schematic view of the longitudinal sealing device according to FIG. 4a along the running direction of the packaging material.

FIGS. 4a and 4b show a first preferred configuration of the arrangement of the sealing outside surface 17 relative to the conveying outside surface 18. Identical parts, in this case, are designated with the same references as in the preceding figures. The longitudinal sealed seam 2 is provided with the pair of sealing rollers 9 or with the sealing outside surface 17. The longitudinal sealed seam 2, in this case, is located substantially in the effective region 12 of the pair of sealing rollers 9. In addition, in this case, the pair of conveyor rollers 10 engage by way of the conveying outside surfaces 18 in the region of the longitudinal sealed seam 2 and in the non-heated region 21 of the seam portion 5. This is substantially a similar configuration as has already been explained in FIG. 2b.

FIG. 4b shows a schematic representation in the direction of the running direction L. Above the conveying plane T it can easily be seen that the product 20 to be packaged is surrounded by the packaging material 3, here by the tubular portion 4. In addition, it can easily be seen that the seam portion 5 projects downward through a slot 22 in the conveying plane T to the pair of sealing rollers 9 and the pair of conveyor rollers 10. The product 20 is consequently completely surrounded by the tubular bag 4 and the tubular bag 4 is sealed by the longitudinal sealed seam 2 in the region of the seam portion such that the product 20 is completely surrounded by the packaging material 3.

The distance A and the space 11 can also easily be seen in FIG. 4b. The sealing outside surfaces 17 of the sealing rollers 9a, 9b are located at a spacing from the conveying plane T. The conveyor rollers 10a, 10b are arranged in this case such that they extend by way of the conveying outside surface 18 both in the space 11 and in the effective region 12 of the sealing outside surface 17. In a particularly preferred manner, the conveying outside surface 18 can also extend over the effective region 12, as is shown in FIG. 4b. Therefore, by way of the conveying outside surface 18 the conveyor rollers 10a, 10b always engage a cold portion that has not been heated by the sealing rollers 9a, 9b. This prevents the sealed seam 2 being exposed to a load by the conveyor rollers.

Figure 5A:
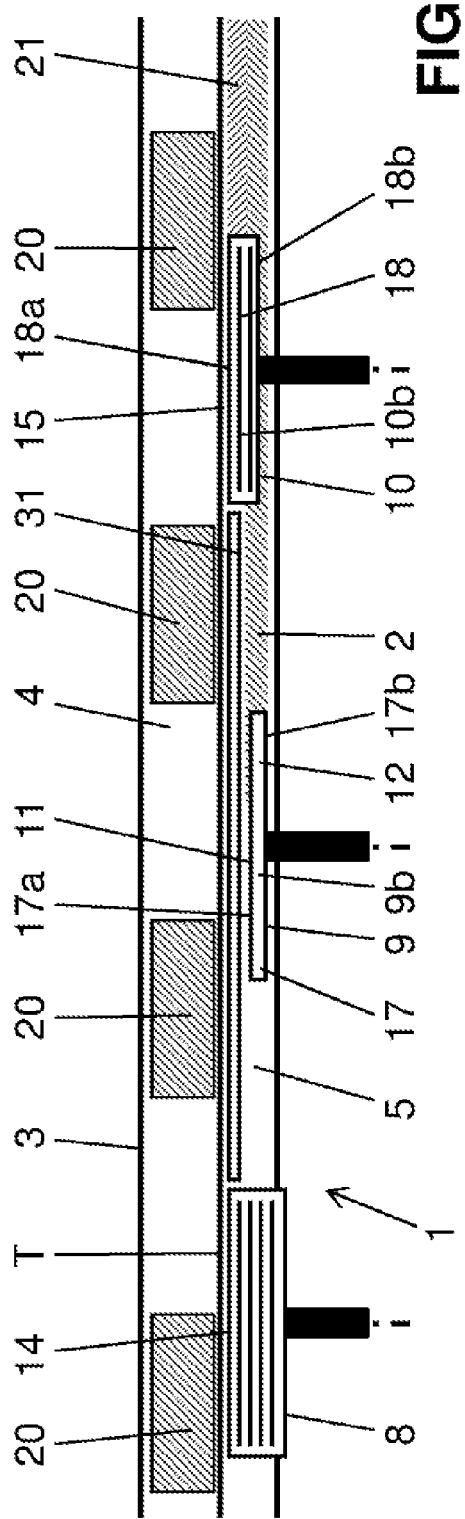
FIG. 5a shows a schematic side view of a longitudinal sealing device according to a second embodiment of the present invention.
Figure 5B:
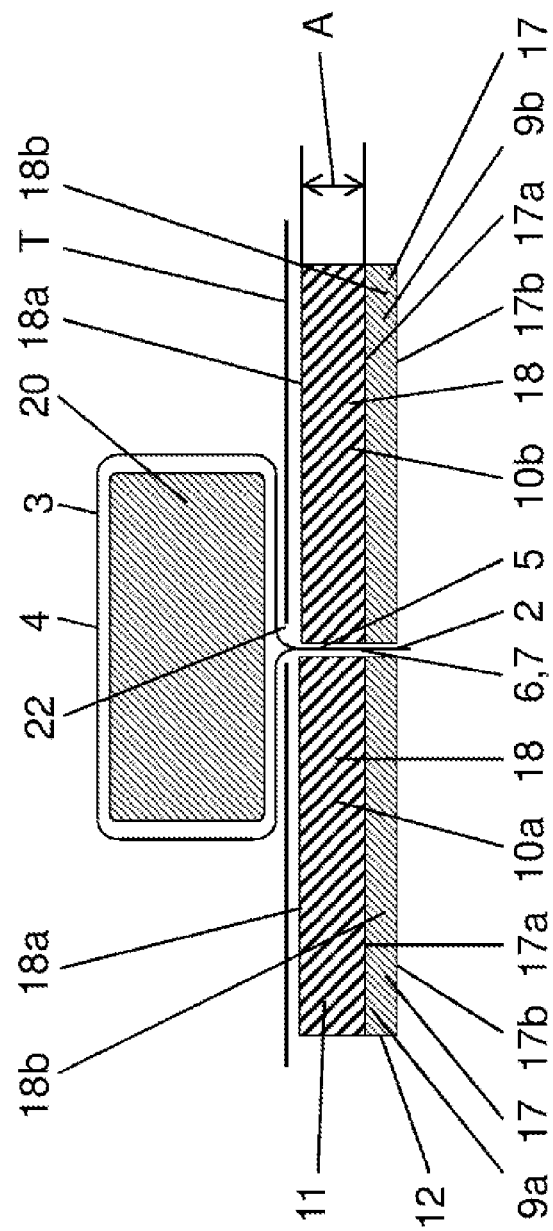
FIG. 5b shows a schematic view of the longitudinal sealing device according to FIG. 5a along the running direction of the packaging material.

FIGS. 5a and 5b show a second configuration of the relative arrangement of the sealing outside surfaces 17 of the sealing rollers 9a, 9b to the conveying outside surfaces 18 of the conveyor rollers 10a, 10b. Identical parts are once again provided with identical references. In this case, the bottom edge 18b of the conveying outside surface 18 is located at substantially the same height or slightly below the top edge 17a of the sealing outside surface such that the pair of conveyor rollers 10 engage by way of the conveying outside surface 18 substantially bordering the effective region 12 of the sealing outside surface 17 of the pair of sealing rollers 9. In other words it can be said that in this case the conveying outside surfaces 18 are located in such a manner with respect to the sealing outside surfaces 17 that the conveying outside surfaces 18 only engage in part in the effective region 12 of the sealing outside surfaces 17. As a consequence, the conveying outside surface 18 does not extend fully over the sealed seam 2. The advantage of this is that the influence on the sealed seam can be further minimized.

Figure 6A:
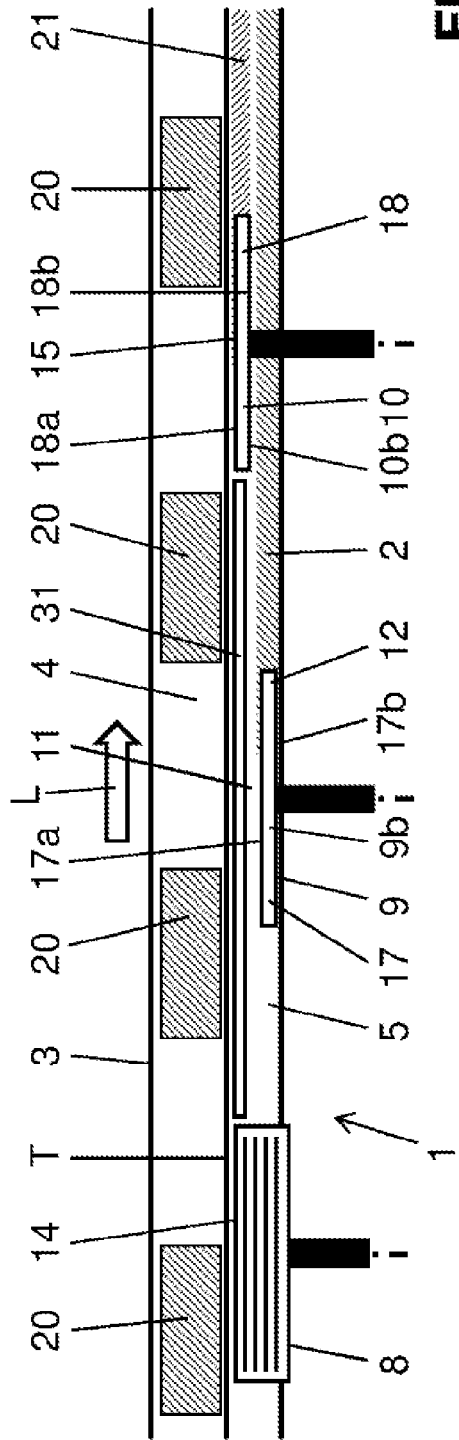
FIG. 6a shows a schematic side view of a longitudinal sealing device according to a third embodiment of the present invention.
Figure 6B:
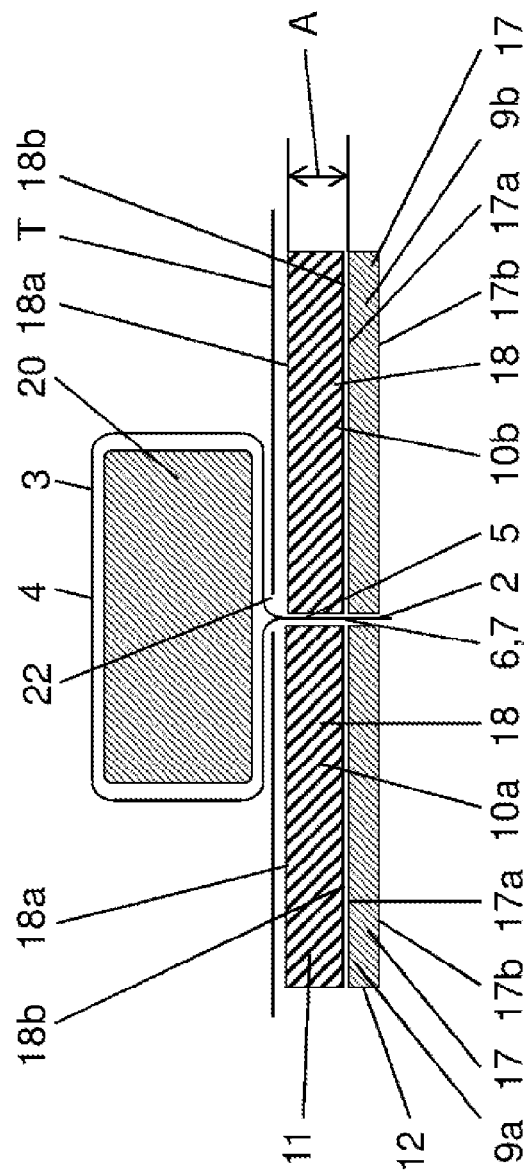
FIG. 6b shows a schematic view of the longitudinal sealing device according to FIG. 6a along the running direction of the packaging material.

FIGS. 6a and 6b show a third possible configuration of the relative arrangement between the sealing outside surfaces 17 of the sealing rollers 9a, 9b and the conveying outside surface 18 of the conveyor rollers 10a, 10b. When viewed in the running direction L, in this case the sealing outside surface 17 and the conveying outside surface 18 are located spaced apart from one another. There is no overlap. The bottom edge 18b of the conveying outside surface 18 is located above the top edge 17a of the sealing outside surface such that the pair of conveyor rollers 10 engages by way of the conveying outside surface 18 outside of the effective region 12 of the sealing outside surface 17 of the pair of sealing rollers 9. As a consequence, in this case the conveying outside surface 18 exclusively engages the non-heated region 21 of the seam portion 5. In this case the sealed seam 2 does not contact the conveying outside surface 18. Said configuration has proved to be advantageous in the case of particularly thin films.

Consequently, further features of the longitudinal sealing device 1 are explained below with reference to the enlarged representation in FIG. 2b. Said features can be applied to all the exemplary embodiments named herein.

The conveying outside surface 18 of the pair of conveyor rollers 10 comprises a height H10 when viewed at right angles to the conveying plane T. Depending on the configuration, said height H10 can be smaller than the distance between the conveying plane T and the top edge 17a of the sealing outside surface 17, the conveying outside surface 18 being located exclusively within the space 11 when viewed with reference to the conveying plane T. This is shown, for example, in the configuration according to FIG. 6a/6b. In other embodiments, the height H10 can be greater than the distance between the conveying plane T and the top edge 17a of the sealing outside surface 17, the conveying outside surface 10 being located within the space 11 when viewed with reference to the conveying plane T and the effective region 12 of the sealing outside surfaces 17 when viewed in the direction of the running direction L. This is shown, for example, in FIGS. 4a, 4b, 5a and 5b.

The distance A between the top edge 17a of the sealing outside surface 17 and the top edge 18a of the conveying outside surface 18 is preferably at least 3 mm, in a particularly preferred manner at least 2 mm. In a particularly preferred manner, the distance A between the top edge 17a of the sealing outside surface 17 and the top edge 18a of the conveying outside surface is between 2 mm and 25 mm, in particular between 2 mm and 15 mm and in a particularly preferred manner between 2 mm and 8 mm.

The sealing outside surfaces 17 of the pair of sealing rollers 9 comprise a height H9, as is shown in FIG. 2b. The height H9 is preferably to be understood as the height of the sealing outside surface 17 that is connected to the packaging material 3. In a particularly preferred manner, the height H9 is at least 1 mm, and a maximum of 15 mm, in particular a maximum of 10 mm and in a particularly preferred manner a maximum of 5 mm.

The longitudinal sealing device 1 preferably comprises a positioning device 8. In this case the positioning device 8 includes a pair of non-heated positioning rollers 13 with two positioning rollers 13a, 13b. The positioning rollers 13a, 13b comprise a positioning outside surface 19 each. The two layers 6, 7 of the packaging material 3 can be positioned with respect to one another by way of the positioning rollers 13a, 13b. In addition, the packaging material 3 is movable along the running direction L with the positioning rollers 13a, 13b. In a particularly preferred manner, the pair of positioning rollers 13 connect substantially directly to the conveying plane T by way of the end face 14 that faces the conveying plane T or the positioning outside faces 19. Consequently, the positioning outside surface 19 therefore preferably engages the entire seal portion 5.

It is easy to see from FIG. 2a that in a preferred embodiment the positioning outside surfaces 19, when viewed at right angles to the conveying plane T, correspond substantially to the length B of the seam portion 5 at right angles to the conveying plane T. As an alternative to this, however, the positioning outside surface 19 can also be greater than said length B.

The pair of positioning rollers 13, with the end faces 14 of the positioning rollers 13a, 13b that face the conveying plane T, are preferably located at the same height as the pair of conveying rollers 10 with the end faces 15 of the conveying rollers 10a, 10b that face the conveying plane T. In a particularly preferred manner, the positioning outside surfaces 19 comprise a same height as the conveying outside surfaces 18.

FIG. 2a and FIG. 3 also show that a cooling element 31, which extends from the conveying plane T in the direction of the pair of sealing rollers 9, is advantageously arranged in the region of the pair of sealing rollers 10. The height of the cooling element 31, when viewed from the conveying plane T, however, is smaller than the distance between the end faces of the pairs of sealing rollers 9a, 9b that face the conveying plane T and the conveying plane T or between the top edge 17a of the sealing outside surface 17 and the conveying plane T. The cooling element 31 prevents heat from the sealing rollers 9a, 9b spreading in the direction of the non-heated seam portion 5, also designated by the reference 21. It can also prevent the products heating up unnecessarily. The cooling element 31 is preferably in the form of a metallic plate which is located outside the tubular bag. The cooling element 31 can provide the conveying plane T in the region of the sealing rollers 9a, 9b.

In a particularly preferred manner, the longitudinal sealing device 1 is used in a horizontal tubular bag packaging machine for producing a tubular bag. The conveying plane T, in this case, is in the horizontal.

In summary, the embodiments of the device according to the invention comprise the following advantages:

the tubular bag is pulled at the cold point, as a result of which no negative influences are generated on the sealed seam. A sealed seam can therefore be produced with a high level of precision.

As a result of engaging the cold point, even very thin films are able to be used, which results in cost savings and is still environmentally friendly.

The sealing device is able to be fitted in retro to existing machines.

What is claimed is:

1. A longitudinal sealing device (1) for producing a longitudinal sealed seam (2) on a packaging material (3) which comprises a tubular portion (4) as well as a seam portion (5) that connects to the tubular portion and has the longitudinal sealed seam (2), in which seam portion (5) a first layer (6) of the packaging material and a second layer (7) of the packaging material are located one above the other, wherein the packaging material (3) moves along a conveying plane (T) for the packaging material which extends parallel to a running direction (L) for producing the sealed seam, and wherein the tubular portion (4) on a first side of the conveying plane (T) and the seam portion (5) on a second side of the conveying plane (T) are moved in the running direction (L), wherein the longitudinal sealing device (1) includes a positioning device (8) for positioning the first and second layers (6, 7) with respect to one another, a pair of heated sealing rollers (9) for providing the longitudinal sealed seam (2) between the first and second layers (6, 7) and a pair of non-heated conveyor rollers (10) which are arranged, when viewed in the running direction (L), downstream of the pair of sealing rollers (10), wherein the pair of sealing rollers (9) include two sealing rollers (9a, 9b) which are in contact with the packaging material (3) by way of a sealing outside surface (17) and wherein the pair of conveyor rollers (10) include two conveyor rollers (10a, 10b) which are in contact with the packaging material by way of a conveying outside surface (18), wherein the sealing outside surface (17) of the pair of sealing rollers (9) is arranged offset to the conveying outside surface (18) in a direction (S) perpendicular to the conveying plane, and wherein the sealing outside surface (17) is defined by a top edge (17a) and a bottom edge (17b) and the conveying outside surface (18) is defined by a top edge (18a) and a bottom edge (18b), wherein the top edge of the sealing outside surface and the bottom edge of the conveying outside surface are spaced apart from one another when viewed in the running direction (L).

2. The longitudinal sealing device as claimed in claim 1, wherein the top edge of the sealing outside surface and the top edge of the conveying outside surface (17a, 18a) are arranged offset by a distance (A) with respect to one another with reference to said direction (S) and wherein the top edge (18a) of the conveying outside surface (18) lies closer to the conveying plane (T) than the top edge (17a) of the sealing outside surface lies to the conveying plane (T).

3. The longitudinal sealing device as claimed in claim 2, characterized in that the conveying outside surface (18) of the pair of conveyor rollers (10), when viewed at right angles to the conveying plane (T), has a height (H10) which is smaller than a distance (11) between the conveying plane (T) and the top edge (17a) of the sealing outside surface (17), wherein the conveying outside surface (18), when viewed with reference to the conveying plane (T), is located exclusively within said distance (11).

4. The longitudinal sealing device as claimed in claim 2, characterized in that the distance (A) between the top edge (17a) of the sealing outside surface (17) and the top edge (18a) of the conveying outside surface (18) is at least 3 mm.

5. The longitudinal sealing device as claimed in claim 2, characterized in that the distance (A) between the top edge (17a) of the sealing outside surface (17) and the top edge (18a) of the conveying outside surface (18) is at least 2 mm.

6. The longitudinal sealing device as claimed in claim 2, characterized in that the distance (A) between the top edge (17a) of the sealing outside surface (17) and the top edge (18a) of the conveying outside surface (18) is between 2 mm and 25 mm.

7. The longitudinal sealing device as claimed in claim 2, characterized in that the distance (A) between the top edge (17a) of the sealing outside surface (17) and the top edge (18a) of the conveying outside surface (18) is between 2 mm and 15 mm.

8. The longitudinal sealing device as claimed in claim 2, characterized in that the distance (A) between the top edge (17a) of the sealing outside surface (17) and the top edge (18a) of the conveying outside surface (18) is between 2 mm and 8 mm.

9. The longitudinal sealing device as claimed in claim 1, characterized in that the sealing outside surfaces (17) of the pair of sealing rollers (9) has a height (H9) of at least 1 mm, and a maximum of 15 mm.

10. The longitudinal sealing device as claimed in claim 1, characterized in that the positioning device (8) includes a pair of non-heated positioning rollers (13) with two positioning rollers (13a, 13b) which comprise positioning outside surfaces (19), by way of which non-heated pair of positioning rollers the two layers (6, 7) of the packaging material (3) are positionable with respect to one another and by way of which the packaging material (3) is movable along the running direction (L).

11. The longitudinal sealing device as claimed in claim 10, characterized in that the pair of positioning rollers (13), when viewed in the running direction (L), is arranged upstream of the pair of sealing rollers (9).

12. The longitudinal sealing device as claimed in claim 10, characterized in that the pair of positioning rollers (13) connects substantially directly to the conveying plane (T) by way of an end face (14) that faces the conveying plane (T) or the positioning outside surfaces (19).

13. The longitudinal sealing device as claimed in claim 10, characterized in that a height of the positioning outside surfaces (19), when viewed at right angles to the conveying plane (T), corresponds substantially to a length (B) of the seam portion (5), when viewed at right angles to the conveying plane (T), or is greater than said length (B).

14. The longitudinal sealing device as claimed in claim 1, characterized in that the positioning device (8) includes a pair of positioning rollers (13) with end faces (14) that face the conveying plane (T), wherein the positioning rollers (13) are located at the same height as the pair of conveyor rollers (10) with end faces (15) of the conveyor rollers that face the conveying plane (T), and/or in that positioning outside surfaces (19) of the positioning rollers (13) have an identical height to the conveying outside surfaces (18).

15. The longitudinal sealing device as claimed in claim 1, characterized in that the pair of conveyor rollers (10) each include an end face (15) that faces the conveying plane (T).

16. The longitudinal sealing device as claimed in claim 1, characterized in that a cooling element (31), which extends from the conveying plane (T) in the direction of the pair of sealing rollers (9), is arranged in a region of the pair of sealing rollers (9), wherein a height of the cooling element (15), when viewed from the conveying plane (T), is smaller than a distance between end faces (16) of the sealing rollers (9a, 9b) that face the conveying plane (T) and the conveying plane (T) or between the top edge (17a) of the sealing outside surface (17) of the sealing rollers (9a, 9b) and the conveying plane (T).

17. The longitudinal sealing device as claimed in claim 16, characterized in that the cooling element (15) is in the form of a plate.

18. The longitudinal sealing device as claimed in claim 1, characterized in that each of the pairs of rollers (9, 10, 13) comprise two rollers which are arranged spaced apart from one another and are rotated about center axes (M) which extend parallel to one another, wherein the packaging material (3) runs through said rollers with the seam portion (5).

19. A horizontal tubular bag packaging machine for producing a tubular bag, characterized in that the horizontal tubular bag packaging machine comprises a longitudinal sealing device (1) as claimed in claim 1, wherein the conveying plane (T) is substantially horizontal.

20. The longitudinal sealing device as claimed in claim 1, wherein the first side is above the conveying plane (T) of the longitudinal sealing device (1), and the second side is below the conveying plane (T) of the longitudinal sealing device (1).

21. The longitudinal sealing device as claimed in claim 1, characterized in that the sealing outside surfaces (17) of the pair of sealing rollers (9) has a height (H9) of at least 1 mm, and a maximum of 10 mm.

22. The longitudinal sealing device as claimed in claim 1, characterized in that the sealing outside surfaces (17) of the pair of sealing rollers (9) has a height (H9) of at least 1 mm, and a maximum of 5 mm.

* * * * *